United States Patent
Kuwahara

(10) Patent No.: US 9,311,608 B2
(45) Date of Patent: Apr. 12, 2016

(54) TEACHING SYSTEM AND TEACHING METHOD

(71) Applicant: KABUSHIKI KAISHA YASKAWA DENKI, Kitakyushu-shi (JP)

(72) Inventor: Koichi Kuwahara, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/484,270

(22) Filed: Sep. 12, 2014

(65) Prior Publication Data
US 2015/0112482 A1 Apr. 23, 2015

(30) Foreign Application Priority Data
Oct. 17, 2013 (JP) .................................. 2013-216511

(51) Int. Cl.
G05B 19/04 (2006.01)
G05B 19/18 (2006.01)
(Continued)

(52) U.S. Cl.
CPC ............ *G06N 99/005* (2013.01); *B25J 9/1671* (2013.01); *B25J 9/1684* (2013.01);
(Continued)

(58) Field of Classification Search
CPC .... B25J 9/1684; B25J 9/1671; G06N 99/005; Y10S 901/28; Y10S 901/43; Y10S 901/47; Y10S 901/50; G05B 2219/45065; G05B 2219/35115; G05B 2219/36017; G05B 2219/45013
USPC ................. 700/245, 250, 251, 252, 253, 257; 318/568.11, 568.12, 568.13, 568.14, 318/568.15; 901/28, 43, 47, 50
See application file for complete search history.

(56) References Cited

U.S. PATENT DOCUMENTS

| 5,521,477 | A | 5/1996 | Sasaki | |
|---|---|---|---|---|
| 7,353,081 | B2 * | 4/2008 | Skourup | B25J 9/1664 318/568.2 |

(Continued)

FOREIGN PATENT DOCUMENTS

| JP | 60-195615 | 10/1985 |
|---|---|---|
| JP | 2001-60108 A | 3/2001 |

(Continued)

OTHER PUBLICATIONS

Sheng et al., "Automated CAD-guided robot path planning for spray painting of compound surfaces", Proceedings of The 2000 IEEE/RSJ International Conference on Intelligent Robots and Systems, Takamatsu, Japan, Jan. 1, 2000, vol. 3, pp. 1918-1923, XP001151673.

(Continued)

*Primary Examiner* — Jaime Figueroa
(74) *Attorney, Agent, or Firm* — Mori & Ward, LLP

(57) ABSTRACT

A teaching system includes an image generating unit, a projecting unit, a work line generating unit, an arithmetic unit, and a job generating unit. The image generating unit generates a virtual image including a robot and a workpiece having a processed surface to be processed by the robot. The projecting unit generates a projection plane orthogonal to a normal direction of a desired point on the processed surface selected on the virtual image and projects the processed surface onto the projection plane. The work line generating unit generates a work line for the robot based on setting contents received via the projection plane. The arithmetic unit calculates a teaching value including the position and the posture of the robot at each point of the target points. The job generating unit generates a job program for operating the robot in an actual configuration based on the teaching value.

14 Claims, 11 Drawing Sheets

(51) Int. Cl.
*G06N 99/00* (2010.01)
*B25J 9/16* (2006.01)

(52) U.S. Cl.
CPC ........... *G05B 2219/35115* (2013.01); *G05B 2219/36017* (2013.01); *G05B 2219/45013* (2013.01); *G05B 2219/45065* (2013.01); *Y10S 901/28* (2013.01); *Y10S 901/43* (2013.01); *Y10S 901/47* (2013.01); *Y10S 901/50* (2013.01)

(56) References Cited

U.S. PATENT DOCUMENTS

| | | | | |
|---|---|---|---|---|
| 2007/0282485 | A1* | 12/2007 | Nagatsuka | B25J 9/1671 700/245 |
| 2010/0174398 | A1* | 7/2010 | Kobayashi | H01L 21/681 700/114 |
| 2012/0219699 | A1* | 8/2012 | Pettersson | B05B 12/122 427/8 |
| 2013/0060369 | A1* | 3/2013 | Simard | G05B 19/4083 700/98 |
| 2014/0135986 | A1 | 5/2014 | Kanehara et al. | |
| 2014/0220249 | A1* | 8/2014 | Rouaud | B05B 12/02 427/256 |
| 2014/0236356 | A1* | 8/2014 | Kuwahara | B25J 9/161 700/264 |

FOREIGN PATENT DOCUMENTS

| | | |
|---|---|---|
| JP | 2004-094399 | 3/2004 |
| JP | 2011-005612 | 1/2011 |
| KR | 10-0319650 | 3/1995 |

OTHER PUBLICATIONS

Chen et al., "Automated tool trajectory planning of industrial robots for painting composite surfaces", The International Journal of Advanced Manufacturing Technology, Nov. 2, 2006, vol. 35, No. 7-8, pp. 680-696, XP019559214.
Extended European Search Report for corresponding EP Application No. 14186103.9-1807, Apr. 15, 2015.
Japanese Office Action for corresponding JP Application No. 2013-216511, Sep. 1, 2015.
Korean Office Action for corresponding KR Application No. 10-2014-0138259, Feb. 18, 2016.

\* cited by examiner

⊙ NORMAL DIRECTION

↔ NORMAL DIRECTION

TEACHING SYSTEM AND TEACHING METHOD

CROSS-REFERENCE TO RELATED APPLICATION

This application is based upon and claims the benefit of priority of the prior Japanese Patent Application No. 2013-216511, filed on Oct. 17, 2013, the entire contents of which are incorporated herein by reference.

FIELD

The embodiment discussed herein is directed to a teaching system and a teaching method.

BACKGROUND

Conventionally, there have been developed various types of teaching systems that graphically display a three-dimensional model image of a robot system on a display device based on three-dimensional computer aided design (CAD) data or the like and creates teaching data while carrying out a simulation operation on an operation of the robot system by operating the three-dimensional model image.

Such teaching systems enable an operator to create teaching data without actually operating the robot.

"TEACHING METHOD OF COATING ROBOT AND COATING METHOD" disclosed in Japanese Patent Application laid-open No. 2011-005612, for example, is a method for creating teaching data for a coating robot that coats a car body or the like off-line.

The conventional technology, however, has room for improvement in terms of facilitating teaching on the coating use.

Specifically, to coat a car body or the like, teaching for the coating robot is carried out by setting a plurality of target points on a coating surface and causing a coating gun attached to the coating robot to trace a locus obtained by connecting the target points.

In the conventional technology, however, it is necessary for an operator or the like to set the target points one by one even if the coating surface has a large area like a car body. This makes the process complicated. Furthermore, the coating surface is likely to include a curved surface and an uneven surface. This makes it difficult for the operator to visually set the target points appropriately on the three-dimensional model displayed on the display device.

The disadvantages described above occur not only in coating use and are common to general processing use including surface processing, such as blasting, polishing, and padding.

SUMMARY

A teaching system according an aspect of the embodiment includes an image generating unit, a projecting unit, a work line generating unit, an arithmetic unit, and a job generating unit. The image generating unit generates a virtual image including a robot and a workpiece having a processed surface to be processed by the robot. The projecting unit generates a projection plane orthogonal to a normal direction of a desired point on the processed surface selected on the virtual image and projects the processed surface onto the projection plane. The work line generating unit generates a work line serving as a group of target points for the robot based on a setting content received via the projection plane. The arithmetic unit calculates a teaching value including a position and a posture of the robot at each point of the target points. The job generating unit generates a job program for operating the robot in an actual configuration based on the teaching value calculated by the arithmetic unit.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

An embodiment of a teaching system and a teaching method disclosed herein will be described below in detail with reference to the accompanying drawings. Note that the present invention is not limited to the embodiment illustrated below.

The following describes a teaching system that displays a graphic image of a three-dimensional model of a robot on a display unit, such as a display. The graphic image of a three-dimensional model may be hereinafter referred to as a "virtual image".

While the following describes a coating robot system including a coating robot, for example, the present invention is not limited thereto. The present invention is also applicable to a processing robot system including a processing robot that can perform surface processing, such as blasting, polishing, and padding. The coating robot is hereinafter referred to as a "robot", and the coating robot system is referred to as a "robot system".

Figure 1:
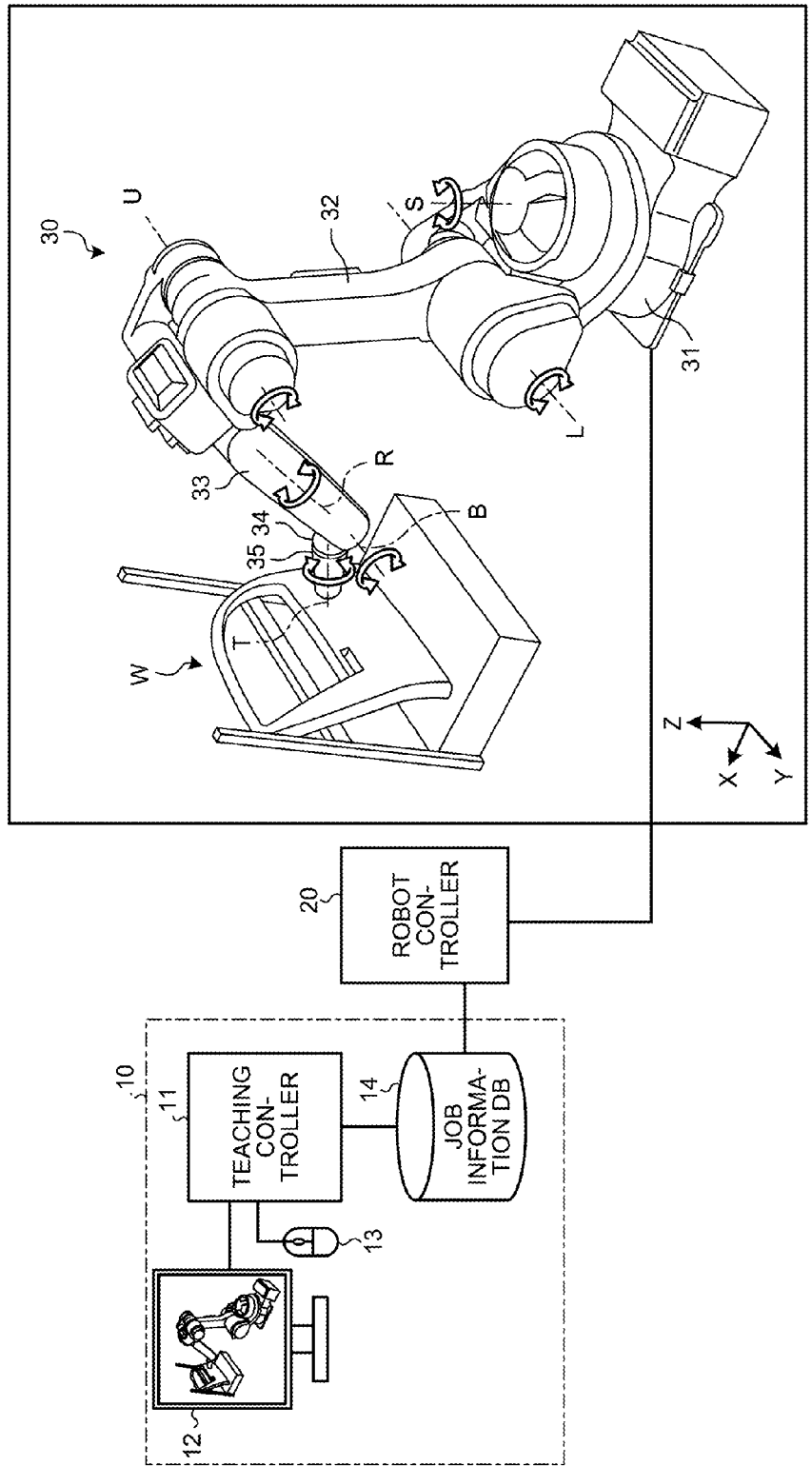
FIG. 1 is a schematic of an entire configuration of a robot system including a teaching system according to an embodiment.

FIG. 1 is a schematic of an entire configuration of a robot system 1 including a teaching system 10 according to an embodiment.

As illustrated in FIG. 1, the robot system 1 includes the teaching system 10, a robot controller 20, and a robot 30. The teaching system 10 includes a teaching controller 11, a display unit 12, an operating unit 13, and a job information database (DB) 14.

The teaching controller 11 is a controller that collectively controls the teaching system 10 and includes an arithmetic processing unit and a memory, for example. The teaching controller 11 is connected to various types of devices of the teaching system 10, such as the display unit 12, in a manner capable of transmitting information.

The teaching controller 11 outputs a virtual image including the robot 30 whose operation is subjected to a simulation operation to the display unit 12 based on an operation performed by an operator with the operating unit 13. The virtual image further includes a workpiece W having a processed surface to be processed by the robot 30. In the present embodiment, the processed surface is a coated surface of the workpiece W, and the workpiece W is a car door panel.

The teaching controller 11 generates a job program for operating the robot 30 from the virtual image based on an operation performed by the operator with the operating unit 13 and registers the job program in the job information DB 14.

The display unit 12 is what is called a display device, such as a display. The operating unit 13 is an input device, such as a mouse. The operating unit 13 is not necessarily provided as a hardware component and may be a software component, such as a touch key displayed on a touch panel display.

The job information DB 14 registers therein information on teaching, such as the job program for operating the robot 30 and a "teaching point" included in the job program.

The "teaching point" is information indicating a target position through which each joint of the robot 30 is caused to pass to reproductively operate the robot 30. The "teaching point" is stored as a pulse value of each encoder provided to a servomotor that drives each shaft of the robot 30, for example. Because the robot 30 is operated based on information on a plurality of teaching points, the job information DB 14 stores therein a plurality of teaching points in association with each motion (job) of the robot 30.

In other words, the job program of the robot 30 includes combined information of a plurality of teaching points, an instruction for an interpolation operation between the teaching points, and an operation instruction for an end effector, for example. The job information DB 14 stores therein information on teaching points for each job program of the robot 30. To reproductively operate the robot 30, for example, the robot 30 is operated based on the job program.

The job information DB 14 is connected to the robot controller 20 serving as a controller that controls an operation of the actual robot 30 in a manner capable of transmitting information. The robot controller 20 controls various types of operations of the robot 30 based on the job program registered in the job information DB 14.

The job information DB 14 (teaching system 10) is connected to the robot controller 20 in FIG. 1. However, the job information DB 14 (teaching system 10) is not necessarily connected to the robot controller 20 as long as the job program generated by the teaching system 10 can be stored in a predetermined storage unit (not illustrated) in the robot controller 20.

By copying the job program generated by the teaching system 10 to a medium, such as a universal serial bus (USB) memory, and connecting the medium to the robot controller 20, for example, the job program may be stored in the predetermined storage unit (not illustrated) in the robot controller 20 with a predetermined operation.

While the job information DB 14 is separated from the teaching controller 11 in FIG. 1 to facilitate the explanation, the job information DB 14 may be stored in a storage unit in the teaching controller 11.

The robot 30 includes a base 31, a first arm 32, a second arm 33, a flange 34, and an end effector 35. The base 31 is fixed to a floor surface or the like and supports the base end of the first arm 32 rotatably about an axis S (refer to the arrow about the axis S in FIG. 1). In addition, the base 31 supports the base end of the first arm 32 rotatably about an axis L (refer to the arrow about the axis L in FIG. 1).

The base end of the first arm 32 is supported by the base 31 as described above, and the tip of the first arm 32 supports the base end of the second arm 33 rotatably about an axis U (refer to the arrow about the axis U in FIG. 1).

The base end of the second arm 33 is supported by the first arm 32 as described above, and the tip of the second arm 33 supports the base end of the flange 34 rotatably about an axis B (refer to the arrow about the axis B in FIG. 1). Furthermore, the second arm 33 is provided rotatably about an axis R (refer to the arrow about the axis R in FIG. 1).

The base end of the flange 34 is supported by the second arm 33 as described above, and the tip of the flange 34 supports the base end of the end effector 35 rotatably about an axis T (refer to the arrow about the axis T in FIG. 1).

The end effector 35 according to the present embodiment is a coating gun, and the base end thereof is supported by the flange 34 as described above.

Joints of the robot 30 are each provided with a driving source, such as a servomotor. The driving sources drive the respective joints of the robot 30 based on an operation instruction transmitted from the robot controller 20.

Figure 2:
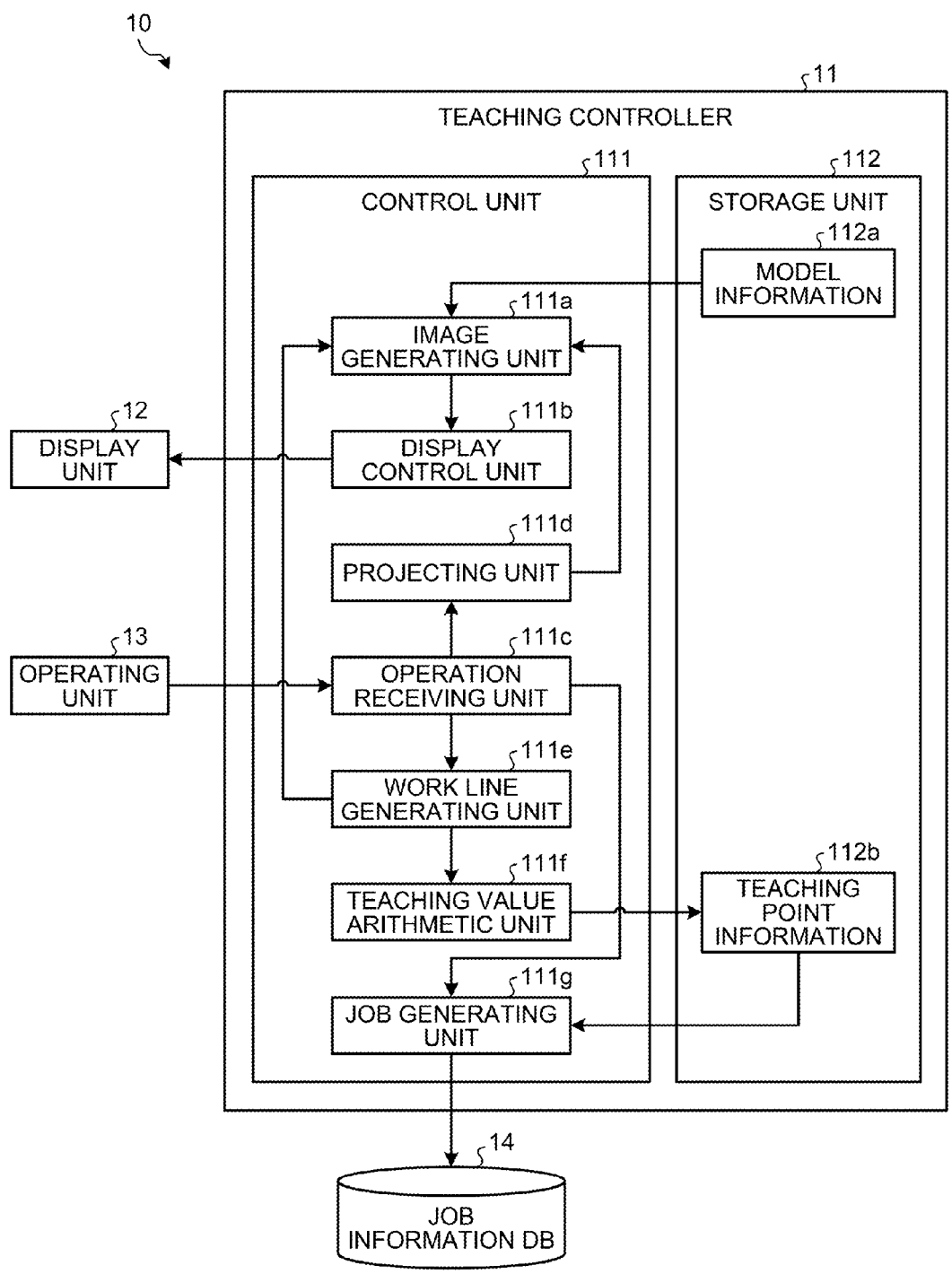
FIG. 2 is a block diagram of a configuration of the teaching system according to the embodiment.

A block configuration of the teaching system 10 according to the embodiment will be described with reference to FIG. 2. FIG. 2 is a block diagram of the configuration of the teaching system 10 according to the embodiment. FIG. 2 illustrates only the components required for the explanation of the teaching system 10 and does not illustrate typical components.

The following mainly describes the internal configuration of the teaching controller 11 with reference to FIG. 2. The following may simply explain the display unit 12, the operating unit 13, and the job information DB 14, which are already explained with reference to FIG. 1.

As illustrated in FIG. 2, the teaching controller 11 includes a control unit 111 and a storage unit 112. The control unit 111 includes an image generating unit 111*a*, a display control unit 111*b*, an operation receiving unit 111*c*, a projecting unit 111*d*, a work line generating unit 111*e*, a teaching value arithmetic unit 111*f*, and a job generating unit 111*g*. The teaching value arithmetic unit 111*f* is an example of an arithmetic unit. The storage unit 112 stores therein model information 112*a* and teaching point information 112*b*.

The image generating unit 111*a* generates a virtual image including the robot 30 and the workpiece W based on the model information 112*a*. Means for generating a virtual image in the claims corresponds to the image generating unit 111*a*. The model information 112*a* includes drawing information defined in advance for each type of the robot 30 and the workpiece W.

The image generating unit 111*a* outputs the generated virtual image to the display control unit 111*b*. The display control unit 111*b* displays the virtual image received from the image generating unit 111*a* on the display unit 12.

The operation receiving unit 111*c* receives an input operation input by the operator with the operating unit 13. If the input operation relates to generation of a work line, which is a group of target points for the robot 30, the operation receiving unit 111*c* notifies the projecting unit 111*d* and the work line generating unit 111*e* of the received input operation.

Examples of the input operation relating to generation of a work line include an operation to determine a coating surface of the workpiece W on the virtual image and select a desired point on the coating surface and an operation to input various types of setting contents for generation of the work line. The specific contents of these operations will be described later with reference to FIG. 5A and figures subsequent thereto.

If the input operation is an operation to instruct generation of a job, the operation receiving unit 111*c* notifies the job generating unit 111*g* of the received input operation. The input operation to instruct generation of a job is an operation of clicking an operating component, such as a "job generation" button, displayed on the display unit 12, for example.

If the projecting unit 111d receives, from the operation receiving unit 111c, the notification that an operation to determine a coating surface of the workpiece W on the virtual image and select a desired point on the coating surface is received, the projecting unit 111d generates a projection plane orthogonal to the normal direction of the point and projects the coating surface onto the projection plane. Means for projecting a processed surface in the claims corresponds to the projecting unit 111d.

The projecting unit 111d outputs the projection plane to the image generating unit 111a. The image generating unit 111a regenerates a virtual image including the projection plane and displays the virtual image on the display unit 12 via the display control unit 111b.

Figure 3A:
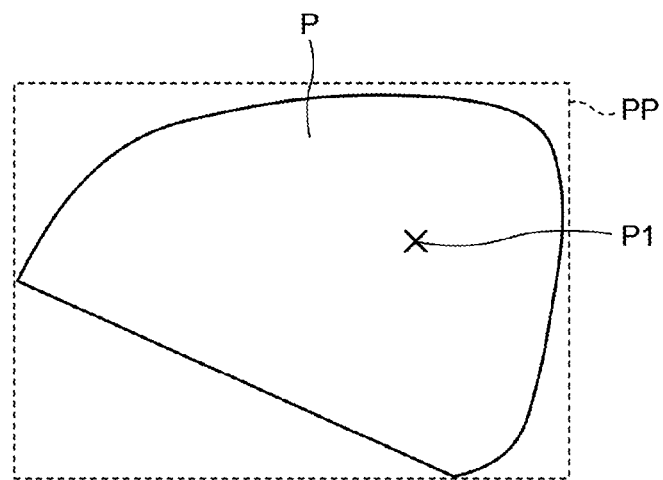
FIGS. 3A and 3B are the first and the second views, respectively, for explaining a projection plane.
Figure 3B:
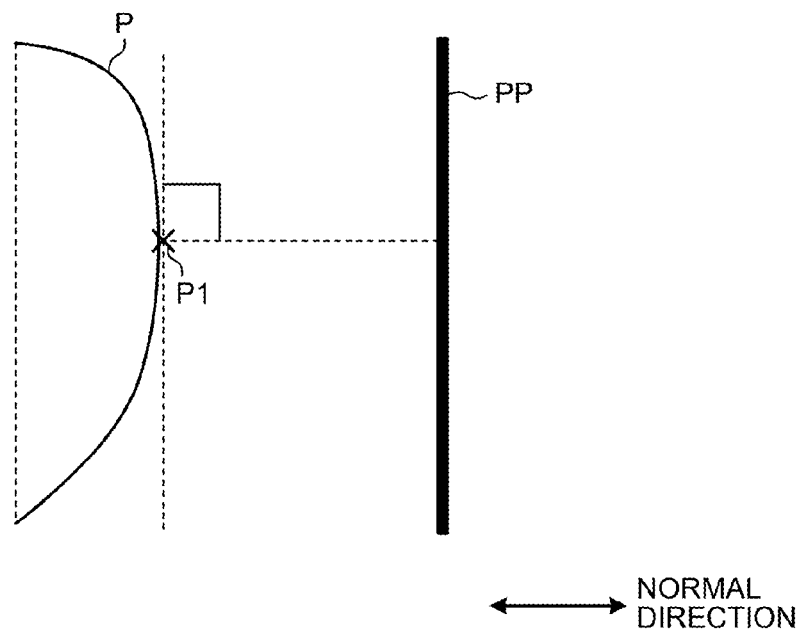

The projection plane will be described. FIGS. 3A and 3B are the first and the second views, respectively, for explaining a projection plane PP. In this example, a part of the workpiece W having the shape illustrated in FIGS. 3A and 3B is determined to be a coating surface P on the virtual image.

As illustrated in FIGS. 3A and 3B, the projection plane PP is generated as a virtual plane orthogonal to the normal direction of a point P1, which is a desired point on the coating surface P selected (hereinafter, which may be referred to as "picked") on the virtual image. The projection plane PP is generated in a substantially rectangular shape covering at least the entire coating surface P when the coating surface P is viewed in the normal direction of the point P1.

In other words, when the desired point P1 on the coating surface P is picked by the operator on the virtual image, the projecting unit 111d generates the projection plane PP using the normal direction of the point P1 as a viewpoint direction. The projecting unit 111d then two-dimensionally projects the coating surface P onto the projection plane PP.

As described above, the present embodiment two-dimensionally projects the coating surface P onto the projection plane PP generated at a point of view in the normal direction of the optionally picked point P1. This can simplify the shape of the coating surface P and facilitate the operator's grasping the shape at a desired point of view.

The operator performs an operation to input various types of setting contents used to generate a work line, which is a group of target points for the robot 30, while viewing the coating surface P projected onto the projection plane PP, that is, via the projection plane PP. This enables the operator to visually set the target points appropriately.

Referring back to FIG. 2, the work line generating unit 111e will be described. The work line generating unit 111e generates a work line based on the setting contents received from the operator via the projection plane PP. Means for generating a work line in the claims corresponds to the work line generating unit 111e.

Specifically, if the work line generating unit 111e receives, from the operation receiving unit 111c, the notification that an operation to input various types of setting contents used to generate a work line is received, the work line generating unit 111e extracts each point of the target points for the robot 30 based on the setting contents, thereby generating a work line serving as a group of target points.

The work line generating unit 111e outputs the generated work line to the image generating unit 111a. The image generating unit 111a regenerates a virtual image including the work line and displays the virtual image on the display unit 12 via the display control unit 111b.

The teaching value arithmetic unit 111f calculates a teaching value including the position and the posture of the robot 30 at each point of the target points based on the work line generated by the work line generating unit 111e. Means for calculating a teaching value in the claims corresponds to the teaching value arithmetic unit 111f.

The teaching value arithmetic unit 111f registers the calculated teaching value corresponding to each point of the target points in the teaching point information 112b.

The teaching value arithmetic unit 111f calculates the teaching value for each joint shaft included in the robot 30 by inverse kinematics calculation, for example. The inverse kinematics calculation is performed on each point in a manner suitable for coating with the coordinate value of each point of the target points in a three-dimensional coordinate system serving as the position of the end effector 35 arranged at the tip of the robot 30 and with a direction orthogonal to the vector direction of the work line on each point serving as the posture of the end effector 35.

The following describes the series of processing performed from the operation receiving unit 111c to the teaching value arithmetic unit 111f in greater detail with reference to FIG. 4 to FIG. 6H.

Figure 4:
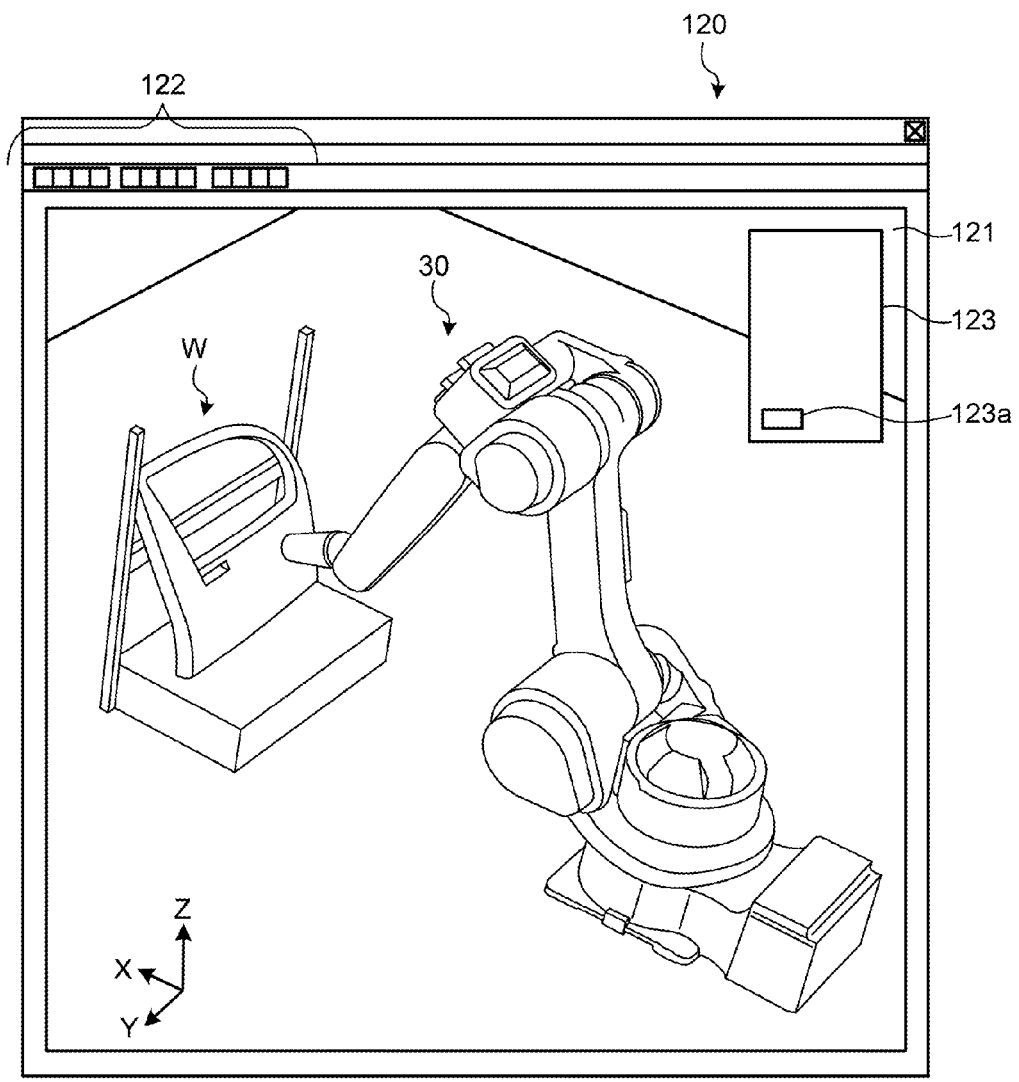
FIG. 4 is a schematic of an example of a virtual image displayed on a display unit.

The explanation starts with an example of the virtual image generated by the image generating unit 111a and displayed on the display unit 12 via the display control unit 111b with reference to FIG. 4.

FIG. 4 is a schematic of an example of the virtual image displayed on the display unit 12. While a robot and a workpiece illustrated in FIG. 4 and figures subsequent thereto are images on the virtual image displayed on the display unit 12, reference numerals "30" and "W" are assigned to the robot and the workpiece, respectively, similarly to the description above. As illustrated in FIG. 4, the virtual image including the robot 30 and the workpiece W is displayed on a display window 120, which is one of display areas on the display unit 12.

Specifically, the virtual image is displayed in a virtual image area 121 on the display window 120. The display window 120 also has a graphical user interface (GUI) widget including a button 122 and a dialog box 123.

A rectangular coordinate system is displayed at the lower left part of the virtual image area 121 and serves as a reference coordinate system in the virtual image. The rectangular coordinate system corresponds to the three-dimensional coordinate system described above and serves as a reference in the horizontal direction and vertical direction. Specifically, a direction parallel to the X-Y plane specified by the X-axis and the Y-axis of the reference coordinate system corresponds to the horizontal direction, whereas a direction parallel to the Z-axis of the reference coordinate system corresponds to the vertical direction.

The operator operates the GUI widget and operable components on the virtual image (e.g., the coating surface P of the workpiece W), thereby performing an instruction operation on the teaching system 10.

Based on the instruction operation performed by the operator, the teaching system 10 can drive each joint of the robot 30 in the virtual image on the display unit 12. In addition, the teaching system 10 can change the point of view by determining the direction to view the virtual image in display and zoom in and out the display.

The teaching system 10 can also derive the position of each joint of the robot 30 when the tip of the end effector 35 (coating gun in the present embodiment) reaches a specific point in the virtual image by inverse kinematics calculation. Thus, the teaching system 10 can generate and display the virtual image of the robot 30 whose tip of the end effector 35 reaches the specific point.

Furthermore, the teaching system 10 can read the teaching points and the job program registered in the job information DB 14 based on the instruction operation performed by the operator. Thus, the teaching system 10 can display the virtual image of the robot 30 whose tip of the end effector 35 reaches a specific teaching point and reproduce a series of operation of the robot 30 performed by the job program on the display unit 12.

Because these functions of an off-line teaching system for a robot are publicly known, a detailed explanation thereof is omitted other than a part according to the present embodiment.

The "job generation" button may be provided to the button 123a in the dialog box 123, for example.

Figure 5A:
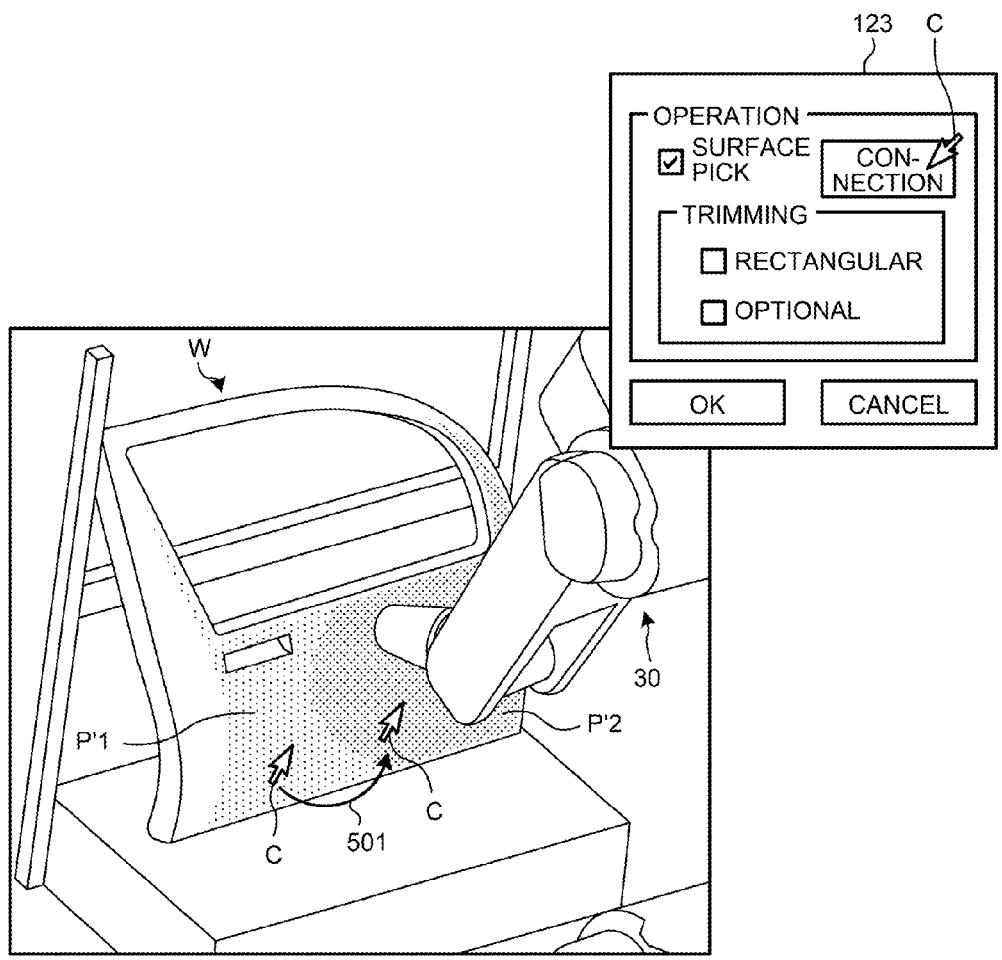
FIGS. 5A and 5B are the first and the second views, respectively, for explaining an operation to determine a coating surface.
Figure 5B:
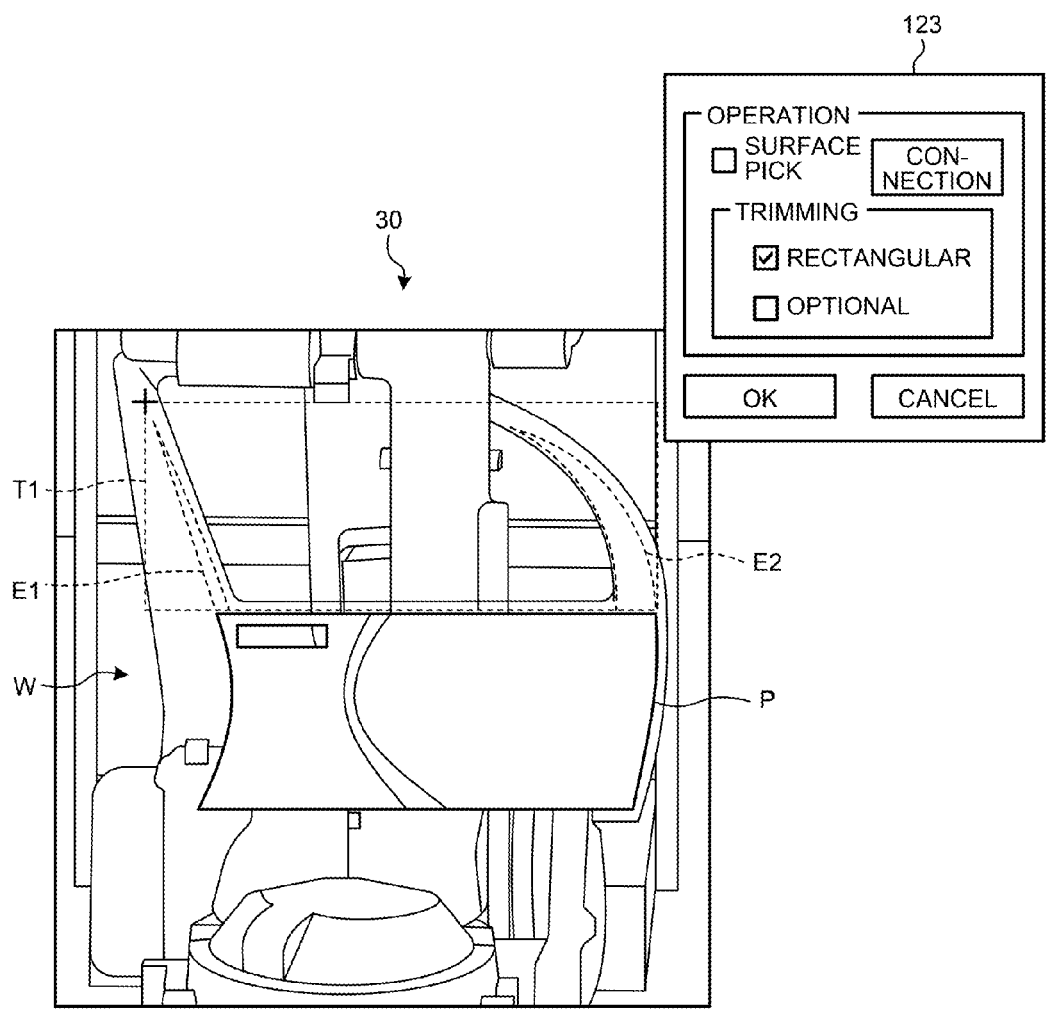

The following describes an operation to determine the coating surface P of the workpiece W on the virtual image performed by the operator with reference to FIGS. 5A and 5B. FIGS. 5A and 5B are the first and the second views, respectively, for explaining the operation to determine the coating surface P.

To determine the coating surface P, the dialog box 123 displays a group of operating components used to determine the coating surface P as illustrated in FIG. 5A. If the operator turns ON a "surface pick" check box, which is one of the operating components, it is possible to select each surface to be coated on the workpiece W.

At this time, a plurality of surfaces can be selected. In the case of the operating unit 13 including a keyboard, for example, the operator consecutively clicks surfaces P'1 and P'2 with a cursor C (refer to the arrow 501 in FIG. 5A) while pressing a predetermined key as illustrated in FIG. 5A. Thus, both surfaces P'1 and P'2 are selected.

After the surfaces to be coated are selected, the operator presses a "connection" button, which is one of the operating components. Thus, the surfaces are connected and considered as one coating surface.

An unnecessary portion in the connected surface can be removed. If the operator turns ON a "rectangular" check box in trimming, which is one of the operating components, as illustrated in FIG. 5B, for example, it is possible to display a rectangular trimming tool T1.

Subsequently, the operator specifies an opposite angle of the rectangle on the virtual image using the operating unit 13 to surround an unnecessary portion in the trimming tool T1, for example, thereby removing the portion (e.g., unnecessary portions E1 and E2 in FIG. 5B). When the operator turns ON an "optional" check box, it is possible to remove an area optionally surrounded with the cursor C, which is not illustrated.

After the unnecessary portion is removed, the operator presses an "OK" button, thereby determining the coating surface P to be coated. Determining the coating surface P with such a simple operation makes it possible to facilitate the operator's teaching on the surface processing.

The following describes an operation to pick the desired point P1 on the coating surface P and an operation to input various types of setting values used to generate a work line with reference to FIGS. 6A to 6H. FIGS. 6A to 6H are the first to the eighth views, respectively, for explaining an operation to generate a work line.

Figure 6A:
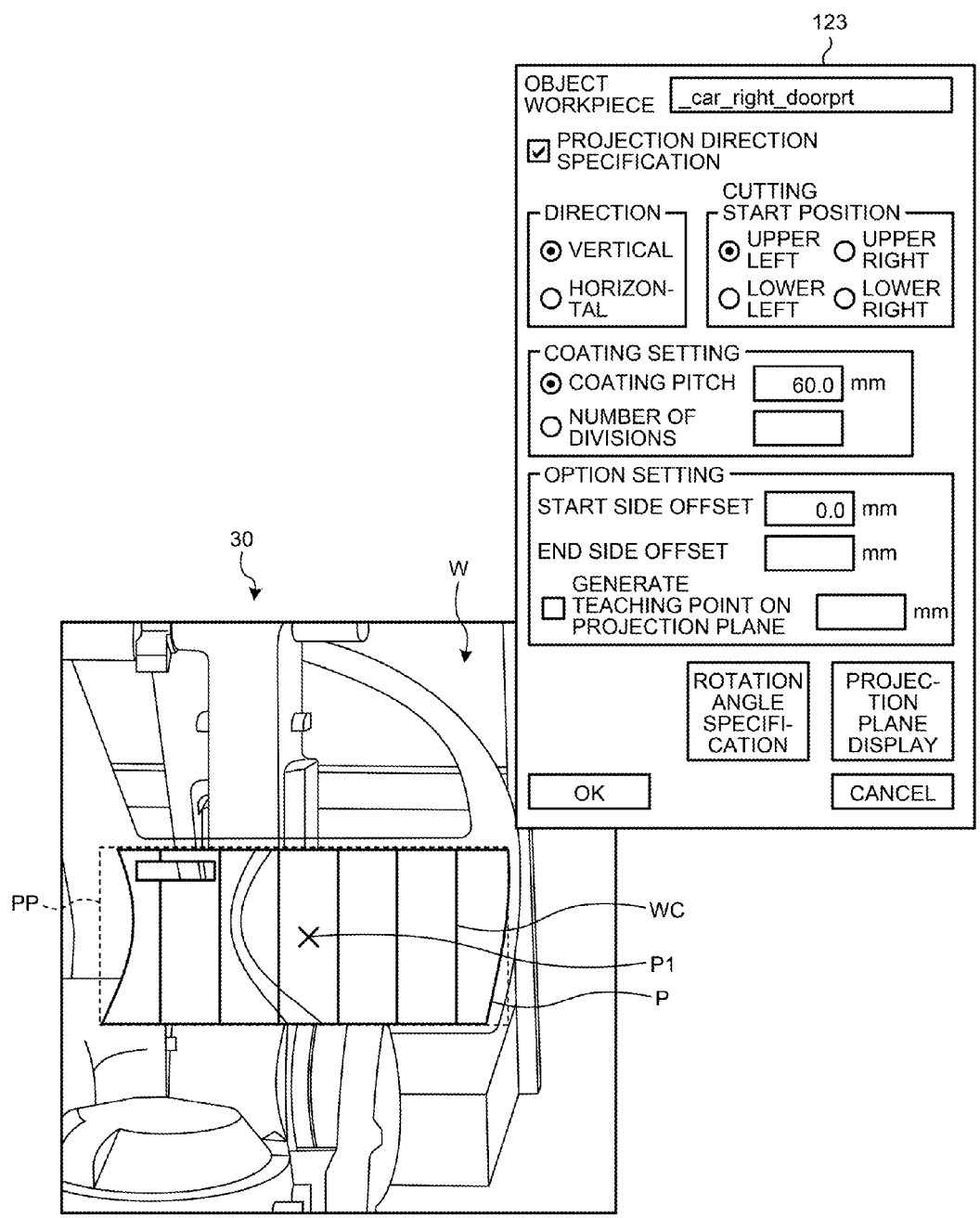
FIGS. 6A to 6H are the first to the eighth views, respectively, for explaining an operation to generate a work line.

After the coating surface P is determined, the dialog box 123 displays a group of operating components used to generate a work line as illustrated in FIG. 6A. If the operator turns ON a "projection direction specification" check box, which is one of the operating components, it is possible to pick the desired point P1 on the coating surface P.

After the point P1 is picked, the projecting unit 111d generates the projection plane PP orthogonal to the normal direction of the point P1 and projects the coating surface P onto the projection plane PP as described above. To facilitate the operator's viewing the projection plane PP, it is preferable to display the projection plane PP while automatically change the point of view for the virtual image such that the normal direction of the point P1 is substantially orthogonal to the planar direction of the display, for example.

After selecting radio buttons indicating "direction" and "cutting start position" and inputting a specified value for specifying "coating pitch" or the like on the dialog box 123, the operator presses a "projection plane display" button. Thus, the work line WC based on these setting contents is displayed on the coating surface P projected onto the projection plane PP.

In the dialog box 123, the operator can set the direction of coating to the vertical or the horizontal direction using the radio buttons in the "direction". In addition, the operator can determine a position on the coating surface P to start the coating using the radio buttons in the "cutting start position".

In "coating setting", the operator can select whether to coat the coating surface P by specifying the coating pitch with a numerical value or the number of times of reciprocation of the coating gun. Furthermore, the operator can input the value of the coating pitch or the number of times of reciprocation (the number of divisions).

In "option setting", the operator can determine how much to offset a coating start position from the end of the coating surface P and how much to offset a coating end position from the end of the coating surface P.

FIG. 6A illustrates an example of display in which the "direction" is set to "vertical", the "cutting start position" is set to "upper left", and the "coating pitch" is set to "60.0" mm.

This configuration can display the work line WC to be actually generated to the operator in a readily graspable manner, thereby facilitating teaching on the surface processing.

Figure 6B:
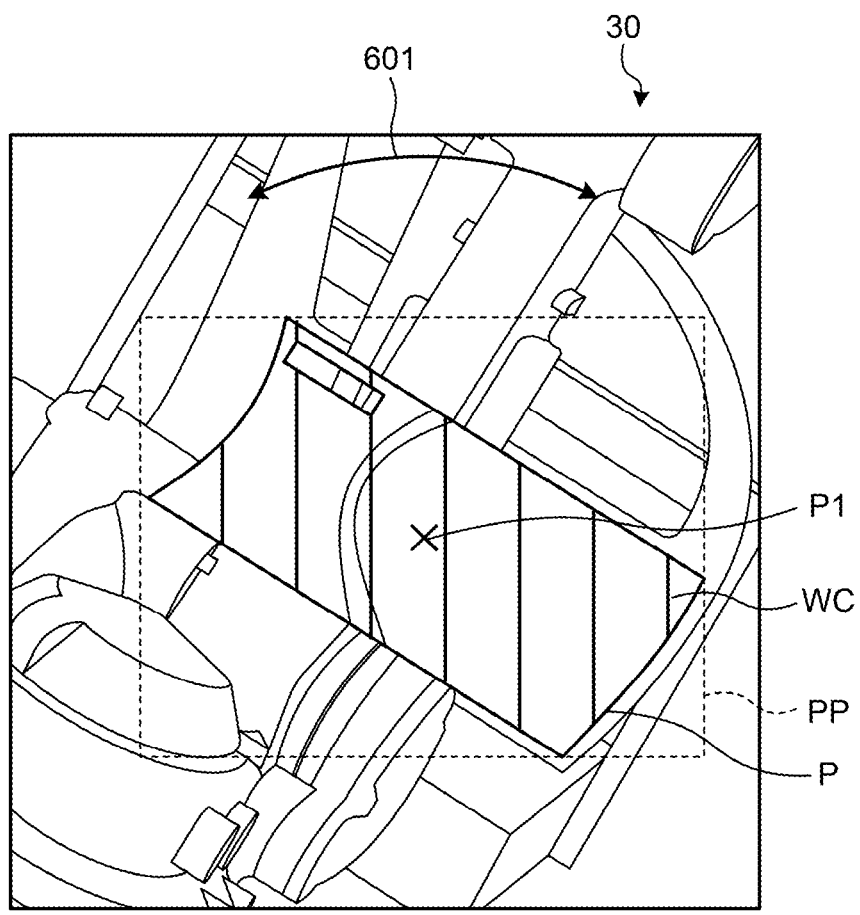

As illustrated in FIG. 6B, the projecting unit 111d can rotate the projection plane PP about the normal direction of the point P1 based on setting contents in an operating component "rotation angle specification" in the dialog box 123, for example (refer to the arrow 601 in FIG. 6B).

As illustrated in FIG. 6B, it is preferable to rotate a part other than the projection plane PP, such as the coating surface P, the robot 30, and the workpiece W, relatively with respect to the projection plane PP. This configuration can display the work line WC to the operator in the same direction without changing the direction of the work line WC, thereby facilitating the operator's grasping the work line WC. In other words, this can facilitate teaching on the surface processing.

In the rotation, the direction and the size of the projection plane PP is sequentially recalculated, and thus the projection plane PP is redisplayed on the display unit 12 by the image generating unit 111a and the display control unit 111b.

In the generation of the work line WC, the work line generating unit 111e can select whether to generate the work line WC on the projection plane PP or the actual coating surface P based on the setting contents in the operating components in the dialog box 123, for example.

Figure 6C:
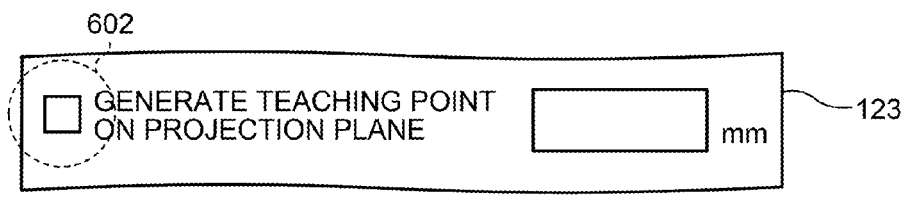

As illustrated in FIG. 6C, for example, an assumption is made that the operator turns OFF a "generate teaching point on projection plane" check box in the dialog box 123 (refer to the portion surrounded by the closed curve 602 in FIG. 6C).

Figure 6D:
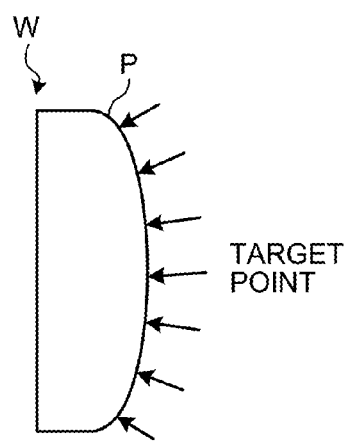

In this case, the work line generating unit 111e generates the work line WC such that the group of target points is arranged on the actual coating surface P of the workpiece W as illustrated in FIG. 6D.

Figure 6E:
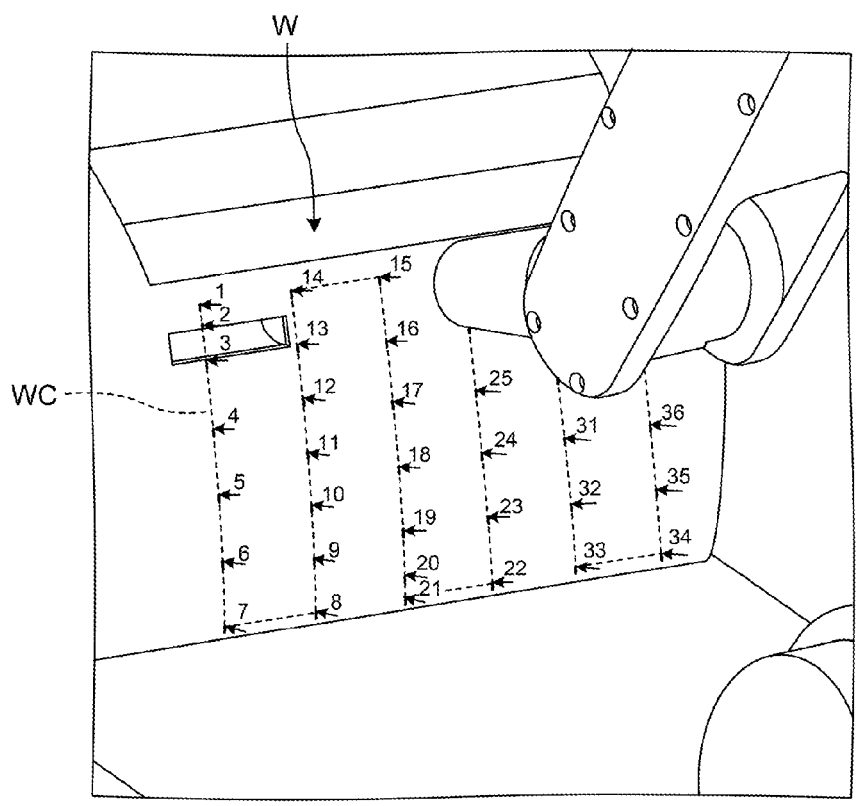

FIG. 6E illustrates an example of a drawing image on the virtual image when the group of target points is arranged on the actual coating surface P. The position of the arrows on the work line WC indicates the position of the respective target points, and the direction thereof indicates the direction of the coating gun corresponding to the end effector 35. The number assigned to the arrows indicates the order of movement of the coating gun.

Figure 6F:
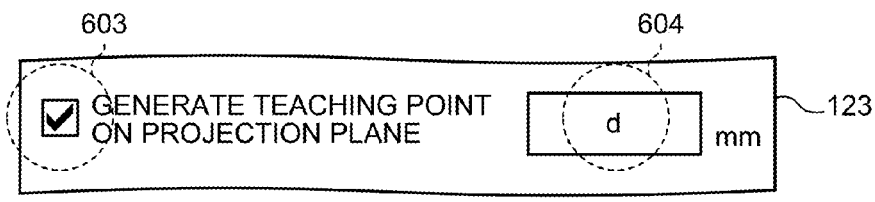

By contrast, an assumption is made that the operator turns ON the "generate teaching point on projection plane" check box in the dialog box 123 as illustrated in FIG. 6F (refer to the portion surrounded by the closed curve 603 in FIG. 6F). Furthermore, the operator sets a specified value "d" mm (refer to the portion surrounded by the closed curve 604 in FIG. 6F).

Figure 6G:
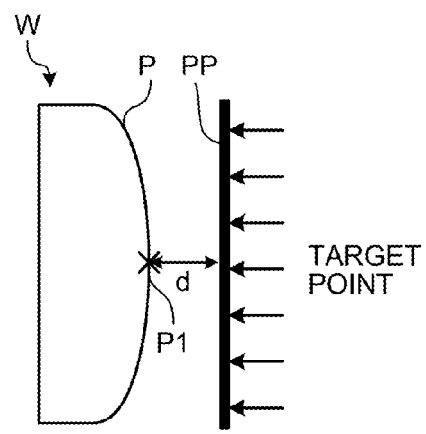

In this case, the work line generating unit 111e generates the work line WC such that the group of target points is arranged not on the actual coating surface P of the workpiece W but on the projection plane PP as illustrated in FIG. 6G. At this time, the projection plane PP is generated at a position away from the point P1 in the normal direction by the distance "d".

Figure 6H:
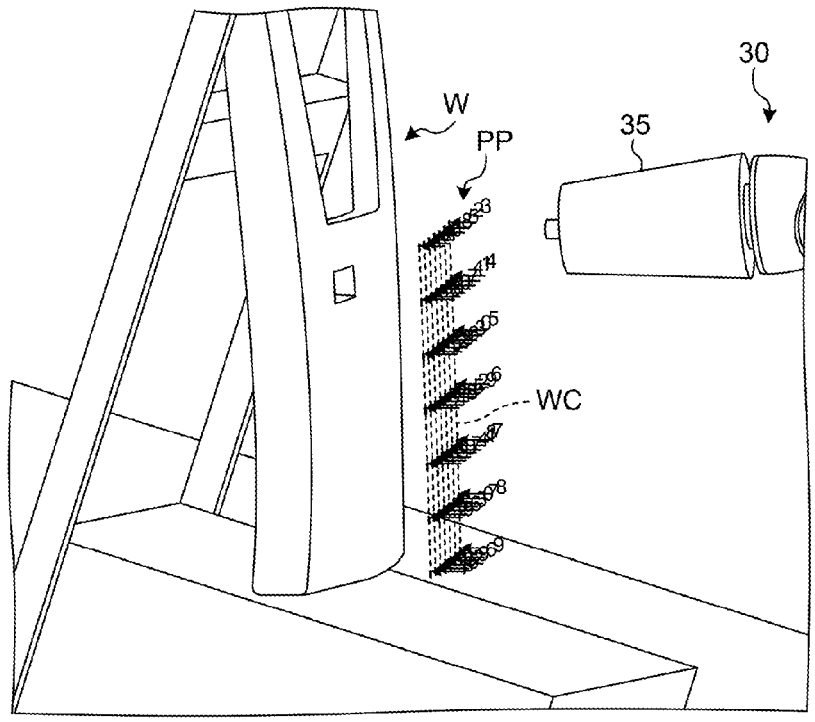

FIG. 6H illustrates an example of a drawing image on the virtual image when the group of target points is arranged on the projection plane PP.

As described above, the present embodiment can select whether to generate the work line WC on the projection plane PP or the actual coating surface P. This can facilitate appropriate teaching depending on the shape of the actual coating surface P and the like.

If the shape of the actual coating surface P has relatively small variations and is suitable for substantially uniform coating, for example, the operator may select the pattern to generate the work line WC on the projection plane PP. By contrast, if the shape of the actual coating surface P has large variations and is not suitable for substantially uniform coating, the operator may select the pattern to generate the work line WC on the actual coating surface P.

In other words, this can facilitate the operator's teaching depending on the coating quality derived based on the shape of the coating surface P or the like with a simple operation.

Referring back to FIG. 2, the job generating unit 111g of the teaching controller 11 will be described. When receiving an input operation to instruct generation of a job from the operation receiving unit 111c, the job generating unit 111g generates a job program for operating the actual robot 30 based on the teaching point information 112b and registers the job program in the job information DB 14. Means for generating a job program in the claims corresponds to the job generating unit 111g.

The storage unit 112 is a storage device, such as a hard disk drive and a non-volatile memory, and stores therein the model information 112a and the teaching point information 112b. Because the contents of the model information 112a and the teaching point information 112b are already explained, the description thereof is omitted.

In the explanation with reference to FIG. 2, the teaching controller 11 generates the virtual image including the robot 30 based on the model information 112a registered in advance, for example. Alternatively, the teaching controller 11 may sequentially acquire information required to generate an image from a host device connected thereto in a manner communicable with each other.

As described above, a teaching system according to the embodiment includes an image generating unit, a projecting unit, a work line generating unit, an arithmetic unit, and a job generating unit.

The image generating unit generates a virtual image including a robot and a workpiece having a processed surface to be processed by the robot. The projecting unit generates a projection plane orthogonal to a normal direction of a desired point on the processed surface selected on the virtual image and projects the processed surface onto the projection plane.

The work line generating unit generates a work line serving as a group of target points for the robot based on setting contents received via the projection plane. The arithmetic unit calculates a teaching value including a position and a posture of the robot at each point of the target points. The job generating unit generates a job program for operating the robot in an actual configuration based on the teaching value calculated by the arithmetic unit.

Thus, the teaching system according to the embodiment can facilitate teaching on surface processing.

In the embodiment above, the projecting unit generates one projection plane orthogonal to the normal direction of a desired point on the coating surface, for example. Alternatively, if a plurality of desired points are selected, the projecting unit may generate a plurality of projection planes for the respective desired points.

Figure 7:
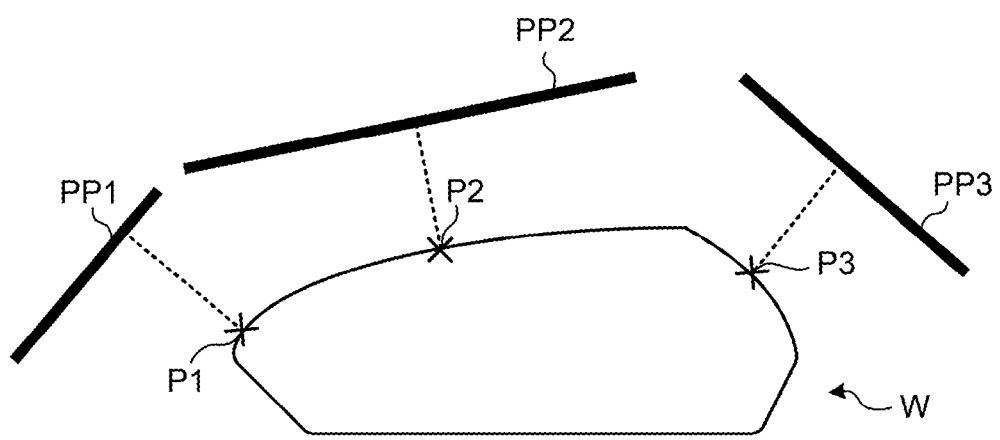
FIG. 7 is a view for explaining projection planes according to a modification.

The modification described above is clearly illustrated in FIG. 7. FIG. 7 is a view for explaining projection planes PP1 to PP3 according to the modification. As illustrated in FIG. 7, a plurality of desired points P1 to P3 may be selected on the coating surface of the workpiece W, and the projection planes PP1 to PP3 may be generated for the points P1 to P3, respectively.

This enables the operator to readily grasp the shape of the coating surface of the workpiece W multidirectionally and simultaneously, thereby facilitating teaching on the surface processing. Furthermore, this enables the operator to carry out teaching on the multidirectional coating surface in parallel, thereby reducing the number of processes required for the teaching.

While the robot is a six-axis single-arm robot in the embodiment above, the number of axes and arms is not limited thereto.

While the operator mainly uses a mouse as the operating unit and performs an input operation and other operations with the mouse in the embodiment above, the embodiment is not limited thereto. The display unit may be a touch panel supporting what is called multi-touch, and the input operation may include a multi-touch operation performed on the touch panel, for example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A teaching system comprising:
   an image generator configured to generate a virtual image including a robot and a workpiece having a processed surface to be processed by the robot;
   a projector configured to generate a projection plane substantially orthogonal to a normal direction of a desired point on the processed surface selected on the virtual image and configured to project the processed surface onto the projection plane, the image generator being configured to display the projection plane on a display such that the normal direction is substantially orthogonal to a planar direction of the display and configured to generate the virtual image on which the projection plane is overlapped with the robot and workpiece to be visible;
a receiver configured to receive an input by a user using the projection plane;
a work line generator configured to generate a work line serving as a group of target points for the robot based on the input;
a calculator configured to calculate a teaching value including a position and a posture of the robot at each point of the target points; and
a job generator configured to generate a job program to operate the robot based on the teaching value.

2. The teaching system according to claim 1, wherein the image generator generates the virtual image including at least one of the projection plane and the work line.

3. The teaching system according to claim 1, wherein the work line generator selects whether to generate the work line on the projection plane or the processed surface based on the input.

4. The teaching system according to claim 2, wherein the work line generator selects whether to generate the work line on the projection plane or the processed surface based on the input.

5. The teaching system according to claim 1, wherein the projector generates a substantial rectangle as the projection plane that covers at least the whole of the processed surface when the processed surface is viewed in the normal direction.

6. The teaching system according to claim 2, wherein the projector generates a substantial rectangle as the projection plane that covers at least the whole of the processed surface when the processed surface is viewed in the normal direction.

7. The teaching system according to claim 3, wherein the projector generates a substantial rectangle as the projection plane that covers at least the whole of the processed surface when the processed surface is viewed in the normal direction.

8. The teaching system according to claim 4, wherein the projector generates a substantial rectangle as the projection plane that covers at least the whole of the processed surface when the processed surface is viewed in the normal direction.

9. The teaching system according to claim 1, wherein the projector specifies a distance from the processed surface to the projection plane based on the input.

10. The teaching system according to claim 1, wherein the projector rotates the projection plane about the normal direction serving as a rotational axis based on the input.

11. The teaching system according to claim 1, wherein the projector generates, when a plurality of desired points are selected, a plurality of projection planes for the respective desired points.

12. The teaching system according to claim 1, wherein the robot is used for coating and the processed surface is a coating surface.

13. A teaching method comprising:
generating a virtual image including a robot and a workpiece having a processed surface to be processed by the robot;
generating a projection plane substantially orthogonal to a normal direction of a desired point on the processed surface selected on the virtual image;
projecting the processed surface onto the projection plane;
displaying the projection plane on a display such that the normal direction is substantially orthogonal to a planar direction of the display;
generating the virtual image on which the projection plane is overlapped with the robot and workpiece to be visible;
receiving an input by a user using the projection plane;
generating a work line serving as a group of target points for the robot based on the input;
calculating a teaching value including a position and a posture of the robot at each point of the target points; and
generating a job program for to operate the robot based on the calculated teaching value.

14. A teaching system comprising:
an image generator configured to generate a virtual image including a robot and a workpiece having a processed surface to be processed by the robot;
a projector configured to generate a projection plane substantially orthogonal to a normal direction of a desired point on the processed surface selected on the virtual image and configured to project the processed surface from which a portion specified by a user has been removed onto the projection plane;
a receiver configured to receive an input by the user using the projection plane;
a work line generator configured to generate a work line serving as a group of target points for the robot based on the input;
a calculator configured to calculate a teaching value including a position and a posture of the robot at each point of the target points; and
a job generator configured to generate a job program to operate the robot based on the teaching value.

* * * * *